(12) United States Patent
Lee et al.

(10) Patent No.: US 9,985,466 B2
(45) Date of Patent: May 29, 2018

(54) OPTIMIZED BATTERY CHARGING METHOD BASED ON THERMODYNAMIC INFORMATION OF BATTERY

(71) Applicant: Korea Advanced Institute of Science and Technology, Daejeon (KR)

(72) Inventors: Sang-Gug Lee, Daejeon (KR); Guillaume Thenaisie, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 156 days.

(21) Appl. No.: 15/044,213

(22) Filed: Feb. 16, 2016

(65) Prior Publication Data

US 2017/0229891 A1    Aug. 10, 2017

(30) Foreign Application Priority Data

Feb. 5, 2016    (KR) ........................ 10-2016-0014929

(51) Int. Cl.
*H02J 7/00* (2006.01)
*H02J 7/04* (2006.01)

(52) U.S. Cl.
CPC ....... *H02J 7/047* (2013.01); *H02J 2007/0096* (2013.01); *Y02B 40/90* (2013.01)

(58) Field of Classification Search
CPC ....... Y02E 60/12; H02J 7/0004; H02J 7/0006; H01M 10/48; H01M 10/4257
USPC ......................................................... 320/106
See application file for complete search history.

(56) References Cited

U.S. PATENT DOCUMENTS

| 6,075,346 | A  | * | 6/2000  | Kikuchi ................ B60K 6/445 320/137 |
| 8,008,891 | B2 |   | 8/2011  | Yun et al. |
| 8,446,127 | B2 |   | 5/2013  | Yazami et al. |
| 2005/0077867 | A1 | * | 4/2005 | Cawthorne ............ B60K 6/445 320/104 |
| 2007/0182418 | A1 | * | 8/2007 | Reynier ................ H01M 6/50 324/429 |
| 2009/0058329 | A1 | * | 3/2009 | Ichikawa ................ B60K 6/26 318/139 |
| 2013/0322488 | A1 |   | 12/2013 | Yazami et al. |
| 2017/0059662 | A1 | * | 3/2017  | Cha ........................ G01R 31/36 |

FOREIGN PATENT DOCUMENTS

| JP | 2008-010420 A | 1/2008 |
| JP | 2012-016109 A | 1/2012 |

OTHER PUBLICATIONS

Office Action for corresponding Korean Application No. 10-2016-0014929 dated Mar. 7, 2017.

* cited by examiner

*Primary Examiner* — Arun Williams
(74) *Attorney, Agent, or Firm* — Harness & Dickey & Pierce, P.L.C.

(57) ABSTRACT

Disclosed is an optimized battery charging method based on thermodynamic information of a battery. Thermodynamic information on a material structure of a battery, for instance, entropy of the battery is extracted. Boundary points at which state transitions of the battery material are determined using the thermodynamic information extracted. Phases of the battery are identified based on the boundary points determined. The most appropriate charging patterns adapted to each of the phases identified are determined. A charging algorithm for charging the battery can be constructed by combining the most appropriate charging patterns determined. This charging algorithm is applied to the charging of the battery.

16 Claims, 12 Drawing Sheets

OPTIMIZED BATTERY CHARGING METHOD BASED ON THERMODYNAMIC INFORMATION OF BATTERY

CROSS-REFERENCE TO RELATED APPLICATION

This application claims priority under 35 USC § 119 to Korean Patent Application No. 10-2016-0014929, filed on Feb. 5, 2016 in the Korean Intellectual Property Office (KIPO), the contents of which are herein incorporated by reference in their entirety.

BACKGROUND

1. Technical Field

The present invention relates to battery charge, and more particularly to a method of charging a battery by adaptively applying an optimized charging pattern for each of the battery phases using an entropy profile of the battery that is thermodynamic information of the battery.

2. Description of the Related Art

Today, around 1.3 billion people have no access to electricity and this number is currently projected to barely change in the foreseeable future. It is forecasted that some 1.2 billion people globally will be still situated in an environment without access to electricity in 2030. The problem is particularly acute in rapidly developing areas of Asia and Africa, where the combination of population growth and industrial development is placing huge demands on the existing electrical infrastructure. However, in the countries where the distribution grid infrastructure itself is lacking, another market for domestic and consumer applications which are not connected to mains electricity is growing rapidly. Devices from the market are frequently powered by batteries, kerosene or diesel generators. However, as the fossil energy will disappear in the near future and new actors such as China or India are absorbing all the oil and gas production increase, it is predicted that the need for batteries will grow significantly over the next decades.

There are also increasing demands for off-grid applications in the developed countries. The people in the countries are using more and more portable electronics such as laptop computers, smartphones, and the like. Markets of electrical vehicles (EV) or hybrid electric vehicles (HEV) start to stretch themselves as the people embrace them due to concerns about environment and economy. In these countries, the internet of things (IoT) is also rapidly increasing, in addition to the already growing demand for energy storage solutions.

The main solution to store electricity in all these devices is the battery even if sometimes small systems rely on hyper-capacitors as well. The majority of currently used batteries are lithium-based batteries such as Li-Ion, Life-Po, etc. due to their higher power densities and fast charging abilities. Also, the lithium-based batteries have low self-discharge, and don't have any requirements for priming. Thus, nowadays the lithium-based batteries are used to power a wide variety of consumer goods ranging from the mobile phones to children toys, e-bikes and passenger vehicles. The lithium-based batteries are already the majority of the battery market, and demands for them are still increasing continuously, with an expectation of their markets to grow 4 times by 2020.

Recently, a hyper capacitor is emerging as a new way to store energy. The hyper capacity provides a high energy density and thus can store almost as much electricity as the battery at a given weight, also having a long life. Compared with the battery, the hyper capacitor is much faster and easier to charge, being safer in use, showing much lower resistance, and providing an excellent low-temperature charge and discharge performance. However, the hyper capacitor has high self-discharge, low cell energy and a linear discharge voltage, which prevent it from using the full energy spectrum. Due to these disadvantages, the hyper capacitor fails to take a main position in the market.

Therefore the lithium-based batteries still dominate the market and such a situation will continue for a long time. However, the lithium-based batteries also face some challenges. They are not as robust as some other rechargeable technologies. They require protection from being over charged and discharged too far. Also, they are sensitive to temperature and misuses of voltage and current. If proper conditions are not satisfied, their life will degrade easily.

Besides, aging process occurring in the lithium-based batteries is another problem. It is dependent upon not only time or calendar but also the number of charge/discharge cycle that the batteries have undergone. What is more, they are potentially explosive and can set fire if not under proper protection.

To solve these issues, battery management engineers have paid great efforts. They come up with battery models and empirical studies have been conducted to try to secure and increase the reliability of lithium use. From these models and studies, engineers have been developing algorithms and hardware to handle the battery security, user safety and battery operational condition. The battery management system (BMS) and lots of literatures produced from the studies define them in details, with various sets of functions.

Over the years, BMS performances have increased significantly, bringing the lithium-based battery technology to the masses. And still, BMS based new models from new empirical studies are being developed.

SUMMARY

Currently the systems are limited by two main factors in term of battery management: one is a battery capacity and the other is a charging time. The first is the tradeoff of the second, and reciprocally. If both are extended without concession, then a third parameter, the battery lifetime which is degraded, may occur as a new issue.

However, a constant current-constant voltage (CC-CV) charge algorithm and a pulsed charge algorithm, which have been conventionally used as a battery charge method, was lack of understanding, at a material scale, of the impact of each of the charge algorithms, and then on a long term effect of the method over the battery when the battery is charged by each of the algorithms. These charge methods may be suspected to be associated with the problems such as sudden explosion or ignition of the battery, abrupt degradation of battery capacity in a short period of time, etc.

Therefore, it is an object of the present invention to provide a battery charging method which can minimize the charging time while minimizing a reduction in capacity of a battery using an entropy profile based on the physical understanding of the battery.

It is another object of the present invention to provide a battery charging method which allows for rapid charging while ensuring the battery life as long as possible, by guaranteeing the battery safety and by not leading the battery over-aging.

It is still another object of the present invention to provide a lithium-based battery charge method which can reduce the charging time without increasing degradation of battery capacity, in particular by optimizing a charging current in the step of charging the battery at a low voltage.

It is still another object of the present invention to provide a charge method that can increase the charge current as much as possible without causing degradation of the battery.

According to an aspect of the present to achieve the objects, there is provided a method capable of charging a battery by applying the most appropriate charging pattern adapted to each of the phases of the battery, using thermodynamic information of the battery.

According to an example of the battery charging method, thermodynamic information on a material structure of a battery, for instance, may be extracted. Boundary points at which state transitions of the battery material may be determined using the thermodynamic information extracted. In a process of charging the battery, state change of the battery material, that is, phase transitions may take place. Phases of the battery may be identified based on the boundary points determined. Then, the most appropriate charging patterns adapted to each of the phases identified are determined.

According to an example of the battery charging method, a charging algorithm for charging the battery may be constructed by combining the most appropriate charging patterns determined. Thus, it is possible for the charging algorithm to charge the battery by applying the most appropriate charging pattern for material state of the battery, that is, adapted for each of the phases.

According to an example of the battery charging method, the charging algorithm may be implemented as at least any one of (i) a program embedded in an integrated circuit system, (ii) a program that can be run by a general-purpose CPU or MCU, (iii) a program that can be run in a cloud computing system, and (iv) a logic circuit on a field programmable gate array.

According to an example of the battery charging method, the thermodynamic information may be entropy profile information on a state of charge (SOC) of the battery. With the entropy profile information, the phases may be identified in a manner that at least one inflection point is found from a graph of the entropy profile and the phases may be isolated using at least a part of the at least one inflection point as a boundary point.

According to an example of the battery charging method, to extract entropy profile information on a state of charge (SOC) of the battery as the thermodynamic information, a temperature of the battery of which functional state is varying may be measured, and an open circuit voltage (OCV) of the battery around a time of measuring the temperature may be estimated. In addition, variation of entropy of the battery may be estimated based on the temperature measured and the OCV estimated. Furthermore, the SOC of the battery may be estimated while monitoring continuously the SOC. And, the estimating of the OCV and the estimating of the variation of entropy may be controlled to be carried out when an SOC estimated through the monitoring is equal to a measurement reference value preset.

According to an example of the battery charging method, the SOC may be calculated by a linear regression analysis method to estimate a remaining charge amount based on a predetermined battery temperature and the OCV of the battery. Alternatively, the SOC may be calculated by a Coulomb counting method that measures a current of the battery and integrates the current with time. Further alternatively, the SOC may be calculated by Kalman filtering.

According to an example of the battery charging method, the thermodynamic information may be acquired by measuring any one of entropy, enthalpy and Gibb's energy of the battery, or any combination of these three state functions.

According to an example of the battery charging method, each of the most appropriate charging patterns is determined by a voltage tuning and/or a current tuning for each of the phases.

According to an example of the battery charging method, the battery may be a lithium-based battery.

According to an example of the battery charging method, to judge whether a phase transition occurs, a threshold value may be set with respect to a predetermined physical quantity for the battery, for each of the phases. The predetermined physical quantity may be measured periodically or according to a predetermined basis while charging the battery. A current phase of the battery may be determined by comparing the predetermined physical quantity measured with the threshold value set for each phase. And, the battery may be charged in accordance with a most appropriate charging pattern adapted to the current phase determined.

On the other hand, there is provided a most appropriate battery charging method according to another example of the present invention. In the charging method, entropy profile information on a state of charge (SOC) of the lithium-based battery may be extracted. A boundary point at which a state transition of a battery material occurs may be determined using the entropy profile information extracted, and phases of the battery may be identified based on the boundary point determined. The most appropriate charging patterns adapted to each of the phases identified may be determined. And, a charging algorithm for charging the battery may be composed by combining the most appropriate charging patterns determined.

According to the another example of the charging method, to extract entropy profile information, it may be done to measure a temperature of the battery of which functional state is varying. It may also be performed to estimate an open circuit voltage (OCV) of the battery around a time of measuring the temperature and to estimate variation of entropy of the battery based on the temperature measured and the OCV estimated. The SOC of the battery may be estimated while monitoring continuously the SOC. And, it may be done to control the estimating of the OCV and the estimating of the variation of entropy to be carried out when an SOC estimated through the monitoring is equal to a measurement reference value preset.

According to the another example of the charging method, each of the most appropriate charging patterns may be determined by a voltage tuning and/or a current tuning for each of the phases.

According to the another example of the charging method, the phases may be identified in a manner that at least one inflection point is found from a graph of the entropy profile and the phases are isolated using at least a part of the at least one inflection point as a boundary point.

According to the another example of the charging method, to judge whether a phase transition occurs, a threshold value may be set with respect to a predetermined physical quantity for the battery, for each of the phases. In addition, the predetermined physical quantity may be measured periodically or according to a predetermined basis while charging the battery. A current phase of the battery may be determined by comparing the predetermined physical quantity measured with the threshold value set for each phase. Thus, the battery may be charged in accordance with a most appropriate charging pattern adapted to the current phase determined.

In a process of charging a battery, state changes (phase transition) of the internal materials of the battery may take place and there may be adaptively optimized charge pattern for each of the phases. Through the application of the battery charge algorithm based on the present invention, the battery can be charged in the most optimized charge pattern for the relevant phase of the battery in the process of phase transitions. Accordingly, the battery degradation due to charge in each phase can be minimized and the battery can be charged at the fastest rate. By charging the battery in this manner for each of the changed phases until the battery is fully charged, it is possible to shorten the battery charging time as much as possible, as well as to minimize degradation of the battery capacity. It is also possible to increase the service life of the battery.

The charging method according to the present invention can optimize the trade-off between shortening the battery charging time and decrease of battery capacity so as to be adaptive to its application.

In addition, it is possible to prevent the risk of accidents such as ignition or explosion of the battery due to overcharging.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EMBODIMENTS

Figure 1:
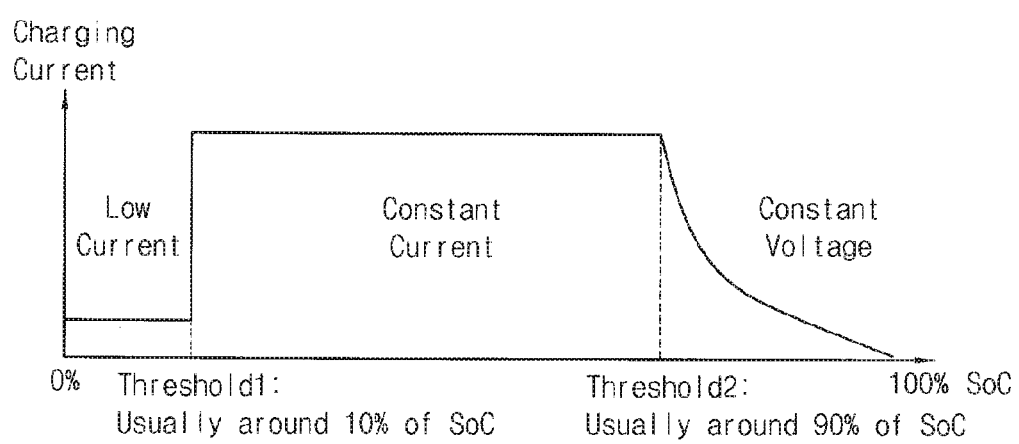
FIG. 1. illustrates a graph showing the CC-CV charging algorithm.

Various example embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, detailed descriptions of the present invention will be given so as to easily carry out it with reference to the accompanying drawings.

(1) Definition of Terms

First, prior to describing the present invention in detail, a brief description of the meaning of key terms used in the present invention will be given.

Open circuit voltage (OCV): Voltage between an anode and a cathode of a battery cell when no load is connected to the battery cell, that is, no current flows out from the battery cell. Theoretically, the maximum value of the OCV becomes equal to the value of the electromotive force of the battery cell.

(Electric) Cell: A device for storing chemical energy that can be converted into electrical energy, usually in the form of direct current.

Battery: A device containing one or a group of cells to store the electrical energy.

State of Charge (SOC): This represents a charged level of the battery, and is equivalent of a fuel gauge for the battery. The units of SOC are percentage points (0%=empty; 100%=full). SOC is normally used when discussing the current state of a battery in use.

State of health (SOH): SOH is a figure of merit of the condition of a battery (or a cell, or a battery pack), compared to its ideal conditions. The units of SOH are percent points (100%=the battery's conditions match the battery's specifications). Typically, a battery's SOH will be 100% at the time of manufacture and will decrease over time and use. However, a battery's performance at the time of manufacture may not meet its specifications, in which case its initial SOH will be less than 100%.

State of Safety (SoS): A probability for a battery at given SOC and SOS to behave hazardously, that is, sudden combustion or explosion mostly.

Battery Management System (BMS): Any electronic system that manages a rechargeable battery (cell or battery pack), such as but not limited to, protecting the battery from operating outside its safe operating area, monitoring its state, calculating secondary data, reporting that data, controlling its environment, authenticating it and/or balancing it.

Enthalpy: A thermodynamic quantity equivalent to the total heat content of a system. It is equal to the internal energy of the system plus the product of pressure and volume. The change in enthalpy of a system is associated with a particular chemical process.

Entropy: A thermodynamic quantity representing the unavailability of a system's thermal energy for conversion into a mechanical work, often interpreted as the degree of disorder or randomness in the system.

Battery cycle: A part of the battery life composed of a discharge and a charge.

Li-based battery: All batteries whose chemistry relies on lithium as one of the two RedOx couples are considered as the lithium-based battery. It envisioned, but is not limited to, Li-Ion, Li—Po, Li—Mn, Li—Al, etc.

(Material) Phase: In the physical sciences, a phase is a region of space (a thermodynamic system), throughout which all physical properties of a material are essentially uniform. Examples of the physical properties include density, index of refraction, magnetization and chemical composition. However, the term phase is used here to refer to a set of equilibrium states demarcated in terms of state variables such as pressure and temperature by a phase boundary on a phase diagram. Because phase boundaries relate to changes in the organization of matter, such as a change from liquid to solid or a more subtle change from one crystal structure to another, this latter usage is similar to the use of 'phase' as a synonym for state of matter.

(2) Charging Time

Nowadays, one of the main trends in battery industry is to reduce the charging time at almost any costs. The chargers deliver more current to charge batteries faster. A new standard for fast charging have been ever made. However, the lithium-based batteries, including lithium-Ion batteries, are very sensitive to over-current, especially in the case of the charging process. Hence, they must be treated carefully. Otherwise, they may behave hazardously and they will present a decreasing capacity as time goes by.

The main algorithms proposed today to charge Li-based battery are based on the CC-CV charge algorithm and the Pulsed charge algorithm. In FIG. 1 illustrated is a graph showing the CC-CV charge algorithm as a relation between the SOC and the current value. According to the CC-CV charge algorithm, the battery is charged by a constant current (CC) mode when the battery is empty due to complete discharge, and if the battery is charged to its maximum chargeable voltage by the CC mode charge, then the charge mode is converted to the constant voltage (CV) charge mode. That is, when for example a lithium battery is almost discharged, the battery is charged by flowing the CC. At this time, the charge current must be smaller than the maximum charge current acceptable to the battery. The battery voltage will rise gradually through the CC charge. When the battery voltage reaches to the maximum charge voltage, the charge mode is converted to the CV charge mode in which the charge voltage is fixed to the CV. When the battery is fully charged, the charge is stopped. The pulsed charge algorithm is to charge the battery by applying a charge current in pulses to the battery. The charging rate can be precisely controlled by varying the width of the pulses, typically about one second. During the charging process, short rest periods of 20 to 30 milliseconds between pulses allow the chemical actions in the battery to stabilize by equalizing the reaction throughout the bulk of the electrode before recommencing the charge.

The CC-CV charge algorithm and the pulsed charge algorithm have been developed for the previous dominant technologies: Ni—Cd and Ni-MH. Obviously, the algorithms have been modified to be adapted, but fundamentally they have not been conceived to properly handle the lithium-based technologies. The main issue is the lack of understanding, at a material scale, of the impact of a charging method, and then on the long term effect of the method over the battery. One could list without being exhaustive, a trend for batteries to explode or take fire in extreme cases, or significant battery capacity loss over short periods of times.

Thus there is a need for a charging algorithm relying on a material understanding of the battery in order to provide the fastest charging process with the maximal protection of both user and battery life.

(3) Battery Capacity

The battery capacity is the amount of energy one can harvest from a cell or a pack from the full charge state to the full discharge state. It is usually expressed in milli-ampere-hour (mA·h), ampere-hour (A·h) or kilo-watt-hour. The mA·h represents the capability of the battery to deliver a current of 1 mA over 1 hour. Thus a capacity of XmA·h reveals that from full charge to full discharge the battery is able to deliver a current of XmA over 1 hour. A watt·hour is similarly the capacity of the battery to deliver a power of 1 W over one hour. The conversion is pretty easy through the equivalence equation: Wh=mAh×V1000

The battery capacity is traditionally computed between the two extreme values of OCV which define the boundary of battery degradation or destruction. However due to a low current (LC) charging scheme of the CC-CV algorithm, the first 10% of the SOC usually requires over 1 full hour to be charged.

For this reason most of consumer electronics companies rose the minimum voltage to 3V (instead of previously 2.7-2.8V), which leads the battery capacity to be reduced by 10 to 20%. The rise of the battery voltage may cause reduction of the discharge current of the battery, and thus decrease of the battery capacity. However, the rise of the battery voltage could allow avoiding the LC charging phase and thus reduce consequently the charging time.

This situation, which comes from a desire of the companies to improve users experience, leads to a reduced battery capacity and battery life and hence to a reduced autonomy of connected devices. Thus many companies are looking for higher density batteries as the volume of the battery reached a peak and seemed to have stabilized. Mostly, this volume is defined by the size of the screen of the devices. Therefore, any solution allowing charging faster the first 10-20% of SOC of the lithium-based battery would increase the available capacity of the cell without impacting its volume. The manufacturing companies of the battery-driven electronic devices such as smartphones do not let the battery be discharged below 10-20% of SOC. The reason is because the battery discharged below 10-20% of SOC should be charged in the LC mode, and due to this the charging time to get out of this phase by raising the charging level over 10-20% of SOC and reach the CC charging mode is too long. Users want to be able to use their electronic devices right away by fast charging them without waiting for a long time. Because of use's demands as such, most battery-driven portable electronic devices are designed to start battery charge from the CC charge mode other than the LC charge mode, in spite of decrease of the battery capacity. Hence if by a mean or another, one could decrease the LC mode charging time, the battery could be used over their full capacity and therefore, the 'available capacity' of the battery would be increased without modifying the battery itself. Hence it would be a ravenous advantage for any off-grid systems that are designed to function without the support of remote infrastructure.

(4) Battery Lifetime

To discuss the battery lifetime, it is necessary to define first the battery capacity loss. Any battery experiences a degradation of its performances over use and time. This degradation affects mostly its full charge capacity, which is reduced as time goes by. The degradation can be expressed in many different ways. Among them, for instance one may be SOH of the battery, and another may be capacity loss of the battery. In both cases, the degradation is expressed as a comparison between the original maximum capacity and the actual maximum capacity. Then depending on the approach, the comparison may compute the quantity or ratio lost from the origin, or remaining quantity or ratio, or the size of the difference.

Defining the battery lifetime is a tricky task. Indeed, the battery lifetime is relative not only to the battery in itself but also to the application or the system for which the battery supplies electric energy. For instance, a user of the smartphone will typically change its battery if the battery capacity falls below 75% of its original value, whereas the users of the laptop computers have been witnessed using battery depleted by more than 80% of their capacity. In any case, the battery lifetime is determined by the estimated number of cycles or operational duration until the battery is considered as not meeting the system specifications anymore. Hence the battery lifetime is a function of the battery degradation rate and the system requirements.

In general, when a battery is quickly charged, or when it is over-charged (for instance, to 4.3V for Samsung batteries), the capacity loss rate is increased. Hence, charging algorithm which charge a battery quickly (and sometimes to high voltage) will increase the battery degradation and thus reducing its already truncated capacity. Therefore a good charging algorithm should provide quick charging time without over-aging the battery.

(5) Solution Proposed by the Present Invention

One of the aims pursued by the present invention is to propose a battery charge method that can reduce the charging time, without increasing the degradation rate of the battery. Especially, the present invention is directed to a lithium-based battery charging method capable of reducing the charging time by optimizing the charge current in a step of charging the battery at a low voltage. Ultimately, the present invention is to provide a battery charge method that can increase the charge current as much as possible without causing performance degradation of the battery or safety accidents due to use a wrong charge method.

These aims can be achieved by considering the material state and its organization rather than simply measuring cell voltage and temperature.

The present may be particularly meaningful to the LC charge mode with a low charging voltage (about from 2.9V to 3.15V).

First, the key principle of the present invention will be described below.

In current CC-CV charging algorithms, the maximal charging current may be defined between 10% and 70 to 90% (depending on sources, manufacturers and technologies) of the battery SOC during the CC phase. The maximal current is defined as the highest value of current that one could use to charge the battery until the life time of the battery is significantly degraded. This value is defined by the battery manufacturer following an equation balancing charging speed, battery life-time, product guarantee and battery market. Thus it may not be a fully scientifically defined value. However it may be generally defined at 1 C.

The current effect on a battery, at a material level, can be understood mostly by considering two factors: a material breakdown voltage value, and a temperature effect on battery aging process.

These two values are defined at a material level by the composition of the material and by its molecular/atomic structure. Hence, considering that the battery is a closed system with no chemical exchange with the outside, the chemical composition is defined by the equations of reaction. In a similar way the thermodynamics conditions will define the material structure of these components.

The temperature elevation in the battery is caused by the following three effects: the heat exchange with outside (in the case of smartphones for instance, this effect can be sometimes dominant), the entropy of reaction, and the joule effect due to the internal resistance. The heat exchange with outside may be a challenge for system designers and will not be addressed here. Similarly, the entropy of reaction is a parameter linked to the very nature of the reaction and cannot be impacted by the charging algorithm, thus it is not a target of the present invention.

Studies have proven that the resistance of a crystal depends on its structures, and in the Li-based batteries, the lithium structure evolved during the charge/discharge process. Here resided the explanation of the battery resistance fluctuations along SOC. Then, by knowing the current crystal structure of the lithium at any instant, one could adapt the charging current to reach an optimum between the breakdown voltage and the over-heating process while keeping it as high as possible in order to reduce the charging time.

According to U.S. Pat. No. 8,446,127 B2 and US2013/0322488 A1, disclosed is a non-destructive way to determine the crystal structure of the lithium in a battery. The descriptions on non-destructive method of determining the crystal structure in these documents are hereby incorporated into the present invention as a part by reference.

Relying on thermodynamic measurements of the battery entropy and enthalpy, the phase transitions occurring along a charge or discharge process in a li-based battery can be determined. Consequently, relying on a previous study of the battery, the phases themselves can be determined.

Figure 2:
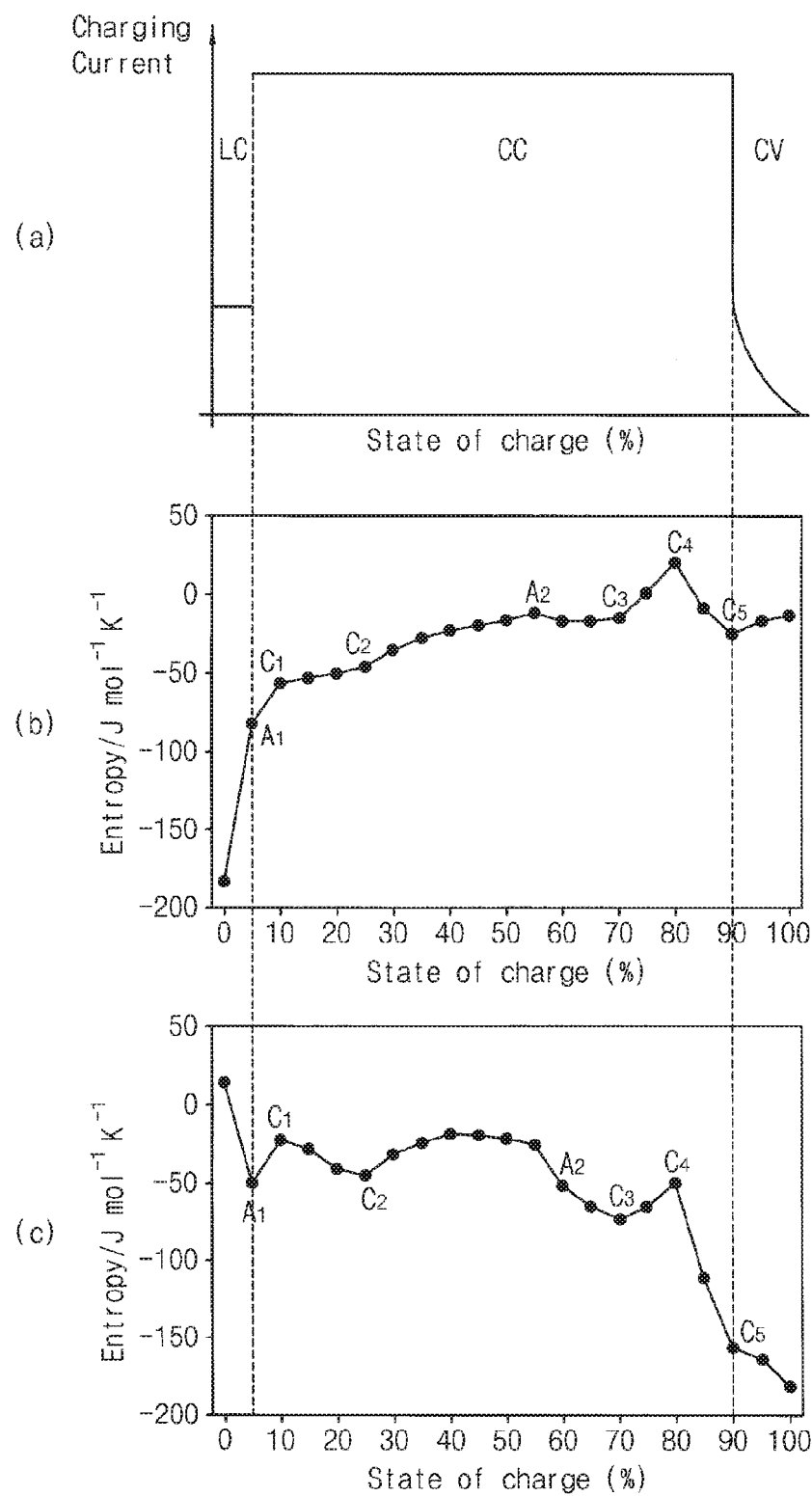
FIG. 2 illustrates a graph showing the correlation between phases of the battery and the CC-CV charging algorithm.

FIG. 2 illustrates a correlation between the CC-CV charge algorithm and the battery phases. That is, illustrated are graphs showing relationship between the entropy and the enthalpy and the SOC of the battery. It is really interesting to notice the matching between the transitions of phases and the thresholds of phases as depicted in FIG. 2. The transitions of phases can be observed through the OCV. In the graphs of FIG. 2, A1 and A2 denote a phase transition occurring on the cathode side of the battery and C1-C denote a phase transition occurring on the anode side of the battery. Hence it can be easily concluded that these transitions are the reason why the charge algorithm transitions take place at these values of OCV. However it is also obvious that many other phases are left aside, which means that other transitions have been neglected.

In the conventional way, three phases could be seen from OCV of the battery, and thus the LC charge algorithm, the CC charge algorithm, and the CV charge algorithm might be applied to each of the three phases. Other phase transitions were neglected because there was no way to know the phase transitions before the entropy profile was measured. But from the battery entropy one can see much more phase, for example, 7 phases, and thus a new proper algorithm is needed. It is possible to determine the criticality of determining precisely the threshold in CC-CV charge algorithm. Thus, it is possible to expect similar impact on the battery life by neglecting or considering the other phase transitions. From the previous studies and engineering reported accidents, one can determine that missing the transition point from LC to CC or CC to CV may strongly degrade the battery life, or directly leads to explosion of the battery. Hence it is assumed that the other phases are also important and that taking them in consideration would increase significantly the lifetime of the batteries and reduce their explosive behavior.

Accordingly, the present invention proposes a method relying on a new charging algorithm based on thermodynamics. The key phases of a battery are specified based on the thermodynamic entropy profile of the battery, and then the most optimized charge algorithm for each of the phases is determined. For each phase the most optimized charge algorithm is applied. The optimized charge mode for each phase may vary relying on the requirements with respect to the charging speed, protection for battery capacity loss, battery safety, etc., and degree of each of the requirements.

The present invention also proposes an optimized charge method capable of specifying the key phases of the battery based on the thermodynamic entropy profile of the battery, and then charging the battery in the fastest and safest way for each of the phases, while minimizing battery damage due to the charging.

An optimal charging algorithm can be built through specifying the key phases (states) of the battery relying on a thermodynamic profile of the entropy/enthalpy/Gibbs energy of the battery, and determining the number of thresholds and the current values associated with them.

Figure 3:
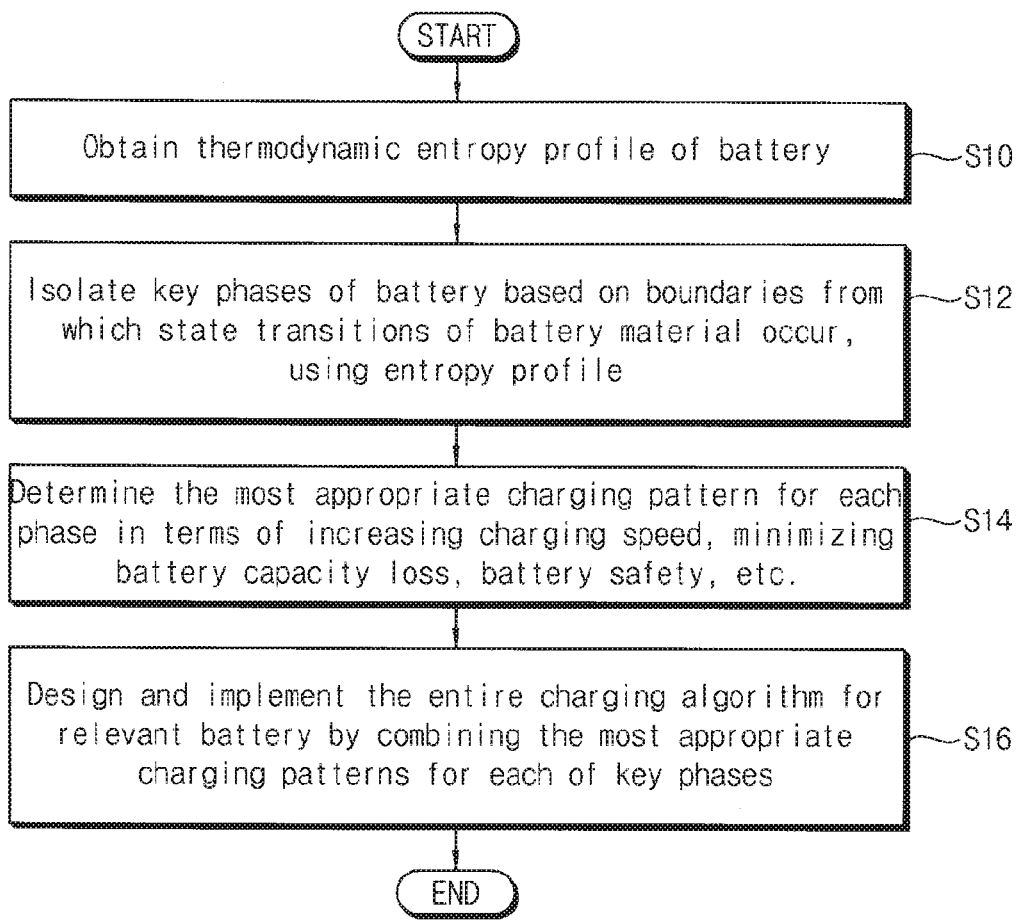
FIG. 3 illustrates a flow chart schematically showing a procedure of an entropy profile-based battery charging method according to a preferred embodiment of the present invention.

In FIG. 3, illustrated is a procedure for building the optimal charge method, according to the present invention, based on the thermodynamic profile of the battery. The optimal charge method of the battery may be performed through the application of the following steps. The charge method may be implemented by hardware and/or software.

(A) Step 1: Extraction of Thermodynamic Entropy Profile of Battery

Firstly, thermodynamic information on the material structure of the battery is extracted through the thermodynamic measurements (Step S10). The thermodynamic information may be acquired by measuring any one of entropy, enthalpy and Gibb's energy, or any combinations of these three state functions. The representative example of the thermodynamic information may be the entropy profile information on the SOC of the battery.

Batteries may have different optimal charging pattern relying on their types. Even the same type of batteries may have different aging states in accordance with their use, and thus may be different from each other with respect to the most appropriate charging pattern. In order to define the most appropriate charging pattern for a specific battery in consideration, what to do firstly is to extract a thermodynamic entropy profile of the battery cell(s). The entropy profile may be directly extracted from the battery. Then, the most appropriate charging pattern may be determined through specifying phases of the battery from the entropy profile extracted, and finding out the most appropriate charging pattern for each of the specified phases. (Details for this will be described below)

The entropy profile of the battery can be extracted by using the thermodynamic method. The thermodynamic method that can be used may be, for example, electrochemical thermodynamics measurements (ETMs) based method or other thermodynamic method. In U.S. Pat. No. 8,446,127 B2 allowed to and US patent application publication No. 2013/0322488 A1 filed by Yazami et al., disclosed is a method of thermodynamically extracting the entropy profile of battery. The concept of the entropy profile extraction method disclosed by Yazami et al. may be used for a part of the present invention. The disclosure with respect to the entropy profile extraction method described by these documents is hereby incorporated into the present invention as a part by reference.

The method proposed by Yazami et al. is worthy to be referred to in that it provides a basic concept that can extract the entropy profile of the battery in a non-destructive way. Yazami's method is a static measurement method to repeat a process consisting of 'measuring the battery temperature and calculating the SOC and OCV of the battery at the measured temperature ('a first step')→waiting until the internal battery reaches a chemical relaxation state after the battery has been charged by a set value of the SOC, for example, 5% of SOC ('a second step') and then performing the first step' until the battery is fully charged. By the way, this method is disadvantageous in that the full charge of the battery requires at least 40 hours.

As a solution to improve the method, the inventors of the present invention propose here a dynamic entropy measurement method based on ETMs. This method will be described for the lithium-ion battery as an example.

By relying on electrochemical thermodynamics measurements (ETMs), it is possible to determine in a non-destructive way the interstate of the Li-Ion battery, and the anode and cathode materials of the battery can be analyzed by computing the parameters such as SOC, SOH, and SOS of a battery. The way to do so is to monitor evolution of battery's OCV ($E_0$) along with the battery cell's temperature (T), at different values of the SOC. The OCV corresponds to lithium stoichiometry x at the anode and the cathode of the battery in $Li_xC_6$ and $Li_{1-x}CoO_2$, respectively. The entropy $\Delta S(x)$ and enthalpy $\Delta H(x)$ state functions can be computed from the general thermodynamics laws:

$$\Delta G(x) = -nF\frac{\partial E_0(x)}{\partial T} \quad (1)$$

$$\Delta G = \Delta H - T\Delta S \quad (2)$$

$$\Delta H(x) = -F\left(E_0 + T\frac{\partial E_0(x)}{\partial T}\right) \quad (3)$$

In the above equations, G represents the Gibb's free energy, n denotes the amount of electron exchange in the conventional basic reaction, and F is the Faraday constant.

Since the entropy $\Delta S(x)$ and the enthalpy $\Delta H(x)$ in Equations (1) and (3) are measured at a defined state of charge of the battery, 'x', the entropy $\Delta S(x)$ and the enthalpy $\Delta H(x)$ can be defined as the local slope of the battery system' total entropy and the total enthalpy variation vs. 'x', respectively. Accordingly, there is no need for a reference state to determine the entropy $\Delta S(x)$ and the enthalpy $\Delta H(x)$.

From the equation (1), the entropy is then determined as the constant coefficient linking the temperature difference and the OCV difference between two measurement points. In other words, the entropy displays a fixed value for a given SOC, and the relationship between the OCV and the temperature is linear. (For the details, refer to equation (5) below along with descriptions of it)

Figure 4:
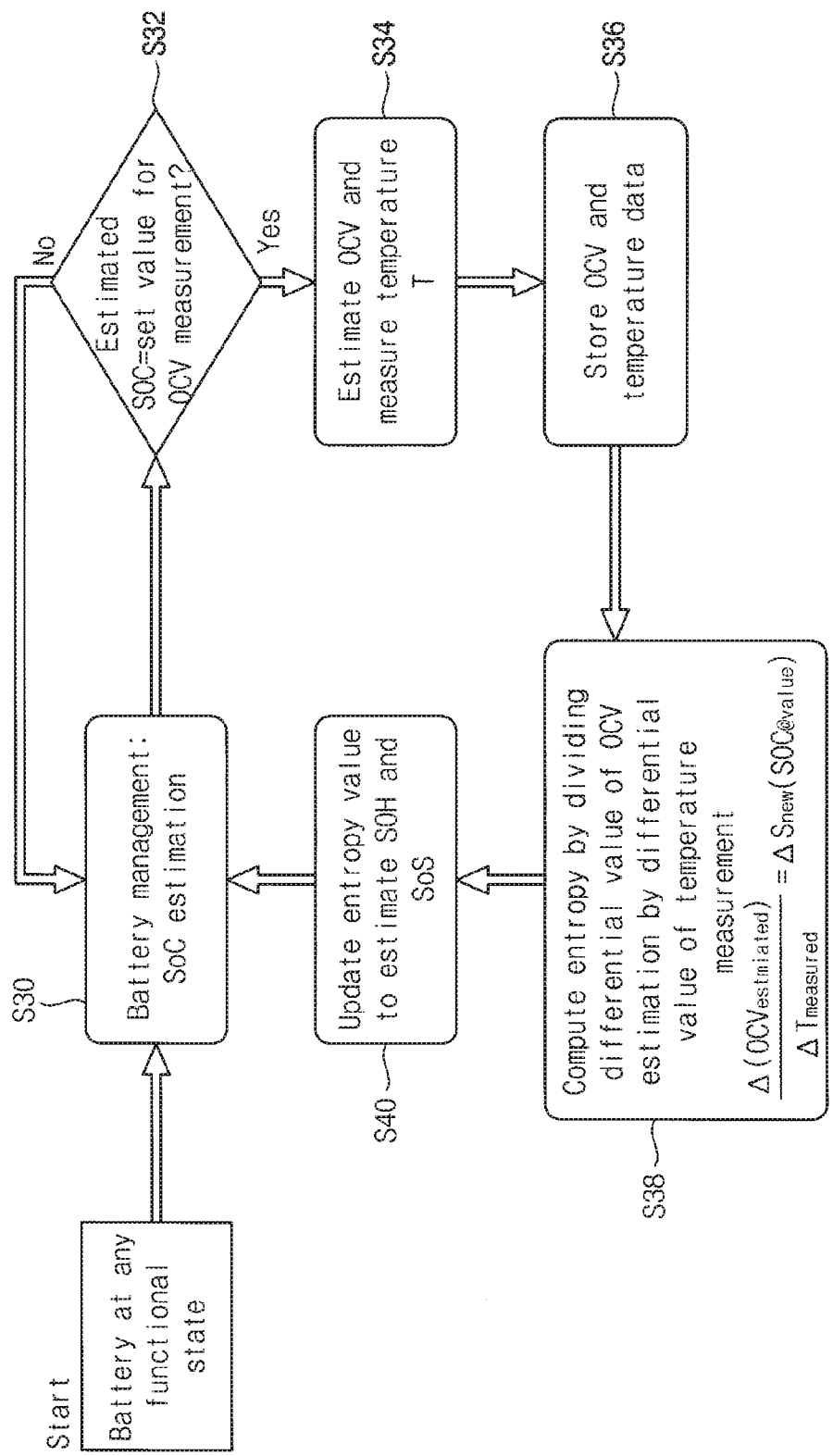
FIG. 4 illustrates a flowchart schematically showing a procedure of the battery entropy profile extraction method according to an embodiment of the present invention.

The ETMs based dynamic entropy measurement method according to the present invention proposes a method to acquire an entropy profile while keeping the battery connected and working, without relying on any external cooling control method. FIG. 4 is a flowchart illustrating an algorithm of the entropy extraction method proposed by the present invention. This algorithm may be implemented as a part of the functions of BMS.

For a chargeable battery in any functional state, the BMS prevents the battery from being operated outside of a safe operation area, and manages the battery with checking necessary matters by monitoring a state of the battery, calculating secondary data, reporting the data, controlling environments of the battery, performing the battery authentication, etc.

Figure 5:
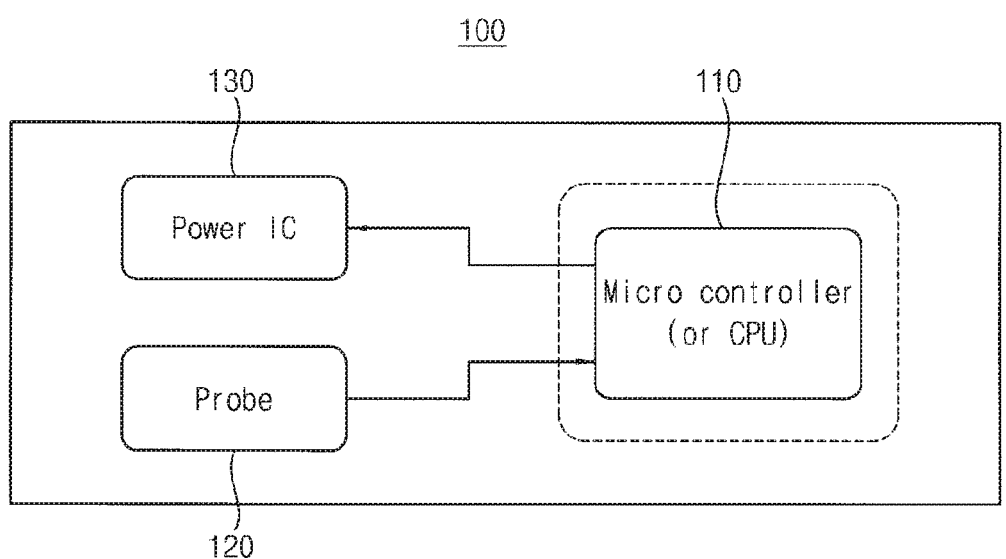
FIG. 5 illustrates an example of a BMS for carrying out the method proposed by the present invention.
Figure 6:
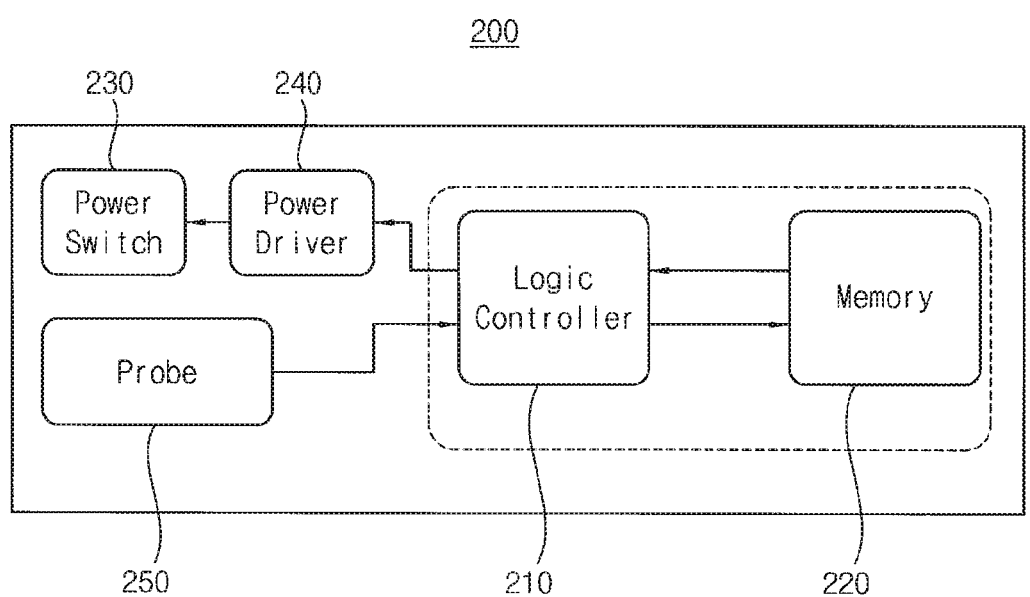
FIG. 6 illustrates another example of the BMS for carrying out the method proposed by the present invention.
Figure 7:
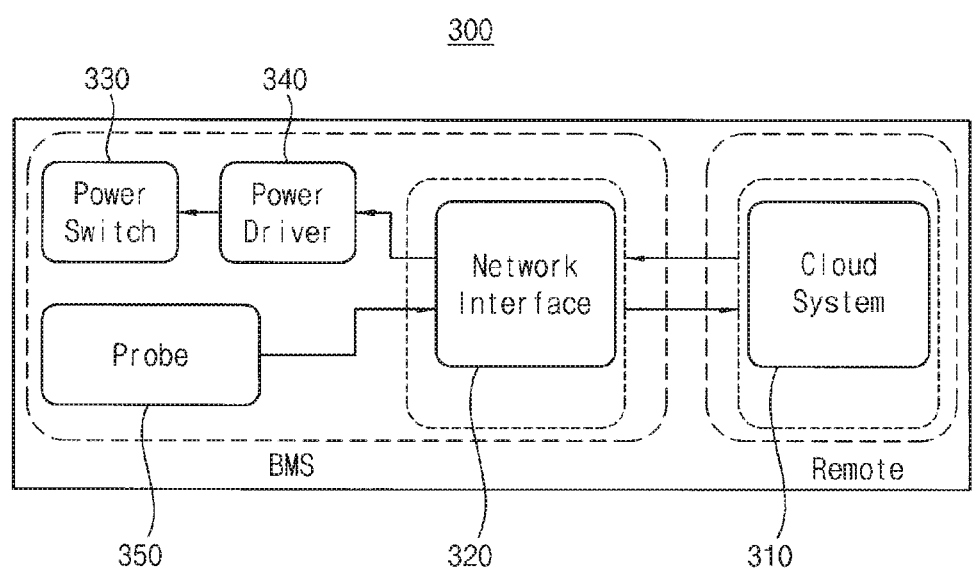
FIG. 7 illustrates further another example of the BMS for carrying out the method proposed by the present invention for the application to a remote cloud computing system.
Figure 8:
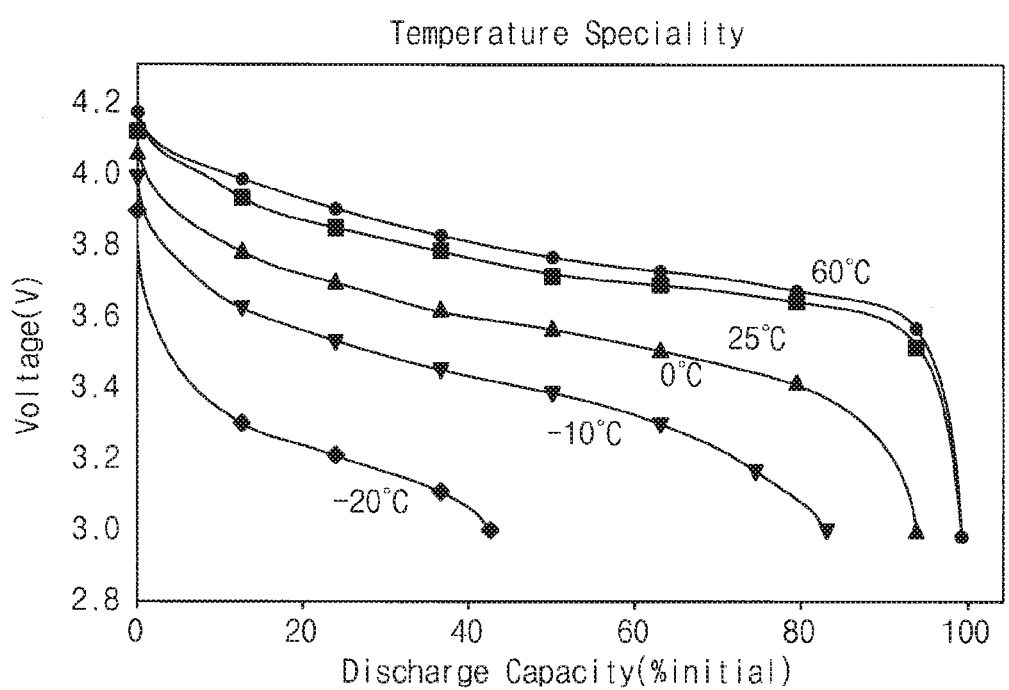
FIG. 8 illustrates an example of a characteristic curve, provided in any data sheet of the Li-ion battery cell, showing the relationship between a battery capacity and an OCV of the battery.
Figure 9:
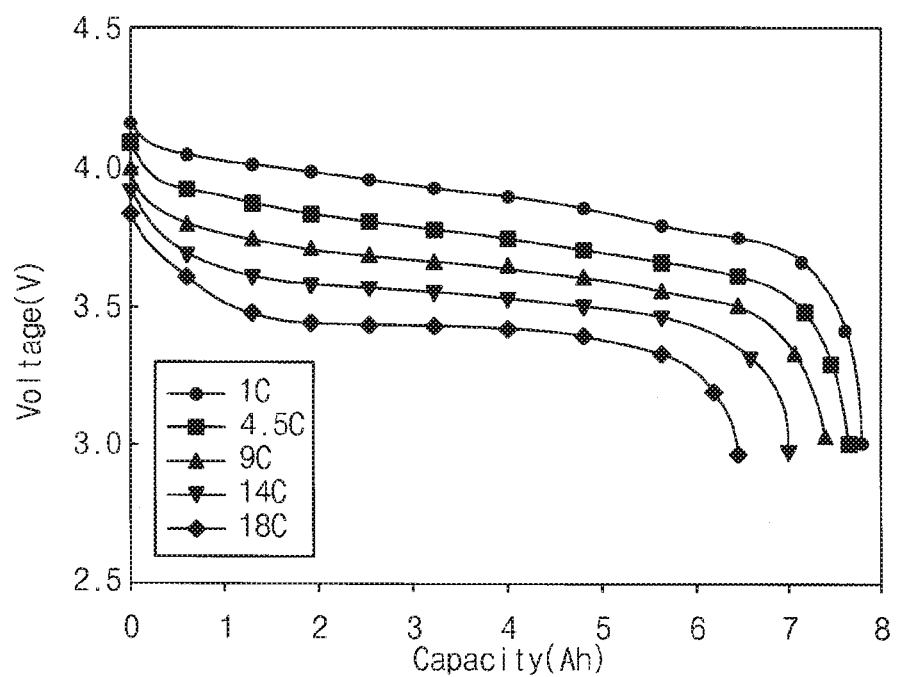
FIG. 9 is a graph showing illustratively the battery voltages for different discharge current values as a function of the battery SOC.

As illustrated in FIG. 5, the BMS for the application of the present invention may be a circuit board type BMS 100 that on a circuit board installed are a micro-controller (or a CPU and a memory) for performing required operations and controls by running programs and storing relevant data, a probe 120 that is connected to the battery and acquires necessary signals to be provided to the micro-controller 110, and a power IC 130 for controlling the battery-driven devices to consume less power. As illustrated in FIG. 6, the BMS for the application of the present invention may be an integrated circuit type BMS 200 implemented with a logic controller 210 and a memory 220 that have a function equivalent to that of the micro-controller 110, a power switch 230 and a power driver 240 (this drives the power switch 230 according to the control of the logic controller 210) that have a function equivalent to that of the power IC 130, and a probe 250. The BMS features of the present invention may act in conjunction with a cloud computing system. That is, the BMS apparatus for this is, as illustrated in FIG. 8, may include a network interface 320 for interfacing communications with a remote cloud system, and a power switch 330 and a power driver 340, and a probe 350 as mentioned above.

As above, the hardware configuration of the BMS applicable to the present invention may vary. Any type of BMS may carry out the functions described below in connection with the battery if it can perform required computations and controls through running relevant programs and other operations such as data storing.

The method of the present invention can be carried out while the battery is being charged or discharged. The SOC value is changed as the battery is charged or discharged. That is, during that time the state of battery may be dynamically changed. The time interval period to extract the entropy of the battery may be set based on the change in the SOC value. For example, it may be programmed that at every 5% change of the SOC relative to the SOC value of fully charged battery a loop for estimating the entropy through the measurements of temperature and OCV should be performed. Of course, the SOC estimating time interval may be set to other values depending on the needs of the system, such as, for example, 1%, 3% or 8%.

The algorithm for the BMS to extract the entropy of the battery according to the present invention is as follows.

The BMS monitors a charged level of the battery, that is, the change in the SOC while continuing to measure the SOC, in the process of charging or discharging the battery (Step S20). The SOC may be measured by an indirect way since it is difficult to measure the SOC directly.

A method for measuring the SOC is to estimate it by a linear regression method on the basis of the OCV and temperature of the battery. Since a voltage of the battery is affected by temperature, the SOC can be calculated with reference to the voltage and temperature of the battery. Specifically, the battery manufacturers provide a data sheet representing the characteristic of the battery for each battery. The battery data sheet usually contains a characteristic curve of the battery, and it is possible to determine an actual charge state (SOC) of the battery from the OCV and temperature of the battery on the basis of the characteristic curve of the battery. FIG. 8 illustrates a characteristic curve showing the relationship between the battery capacity and the OCV that is provided in a data sheet, for example, of 2200 mAh Li-Ion battery cell. The battery voltage is gradually changed in accordance with the remaining charge amount in the battery. Thus, the remaining charge amount in the battery may be estimated by a linear regression estimation using the OCV value and its corresponding temperature measurement value, and battery characteristic curve.

Another method for estimating the SOC of the battery is a method of using a Coulomb counting. The Coulomb counting method, being a fundamentally different approach than the OCV based method, is known as a current integration method. The method calculates the SOC by measuring a battery current and integrating it in time. Instead of considering the potential energy of a known-capacity battery and determining the percentage of charge remaining in it, the method considers the battery as a fuel tank. Hence by measuring the quantity of charge entering the battery during a battery charging process, the method determines the maximum capacity of the battery. Then, by counting the charge flowing out of the battery, the remaining capacity of the battery can be easily determined. The quantity of charge going in or out of the battery is determined by the integral over time interval of the current flowing in or out of the battery, hence named 'Coulomb counting'.

As other methods, in consideration of the limitations of the two methods, that is, the OCV based SOC calculation method and the Coulomb counting based SOC calculation method, one may use another estimation method (a hybrid type method) based on these two OCV estimation methods in combination. This hybrid type method may be used in a manner that one of the two OCV estimation methods makes the other method's error to be reduced. In addition, there is also a chemical method for measuring the specific gravity and pH of the electrolyte of the battery to calculate the SOC.

The BMS monitors the change in the SOC values while measuring periodically the SOC of the battery, using any one of the methods mentioned above. And, whenever the SOC value is calculated, the BMS determines whether the measured SOC value reaches a predetermined value for the entropy extraction (Step S32). For example, if the SOC measurement period is set to 5%, at every 5% increase or decrease of the SOC value compared to that of the previous measurement period the entropy extraction loop (Steps S34-S40) that will be described below may be carried out. In other cases, it is returned back to the step S30 to continue to monitor the change in the SOC value.

In the step S32, if it is determined that the SOC value of the battery reaches the preset value for the entropy measurement, the BMS measures a battery temperature at that time right away. And at the same time, the BMS estimates the OCV of the battery (step S34). Since the OCV is the open circuit voltage of the battery, directly measuring its dynamic variation does not make sense, even hardly impossible in reality. Therefore the OCV is measured indirectly, i.e., estimated. A battery temperature may be measured, for example, in the Celsius unit, and the OCV may be measured, for example, in volts.

In step S34, several methods may be used for the OCV estimation of the battery. An exemplary method to estimate the OCV is, as mentioned in the description of the OCV estimation, a method of using the characteristic curve of the battery.

Figure 10:
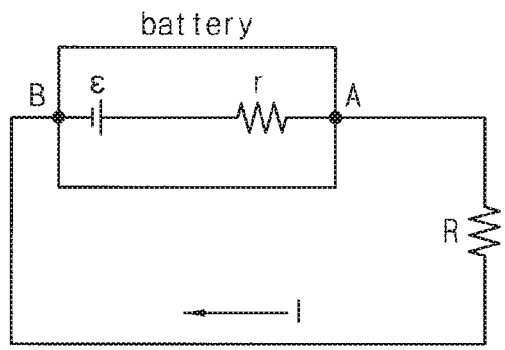
FIG. 10 illustrates an equivalent circuit diagram of the battery modeled in a form consisting of a voltage generator for generating an electromotive force and an internal resistance.

When buying a battery, a data sheet of the battery can be obtained from the battery manufacturer. The data sheet provides the technical specifications of the battery (for example, an operating range, safety working conditions, a size of the package, etc). Most battery data sheet includes information of the characteristic curve representing the relationship between the battery voltage (OCV) and the discharge capacity (SOC). The characteristic curve presents, for example, the battery voltage for different values of the discharge current as a function of the battery SOC. FIG. 10 shows an exemplary graph thereof. In order to estimate the OCV using the characteristic curve, both voltage and current are measured at the terminals of the battery. Then, selected are two curves that discharge current representing the measured current. And by using the two selected curves, values of the OCV can be estimated based on linear regression method.

Another method for estimating the OCV is to represent the battery in a simplified model, when the batteries are exposed to low frequency charge (discharge) variations and its drain (charge) current is not too high (usually 20% or less of the rated current). For example, as shown in FIG. 10, the battery connected to a load (R) can be modeled in the form consisting of a voltage generator for generating an electromotive force (ϵ) and an internal resistance (r). From the equation of ohm, a voltage drop occurring inside the battery can be determined as an effect of current that flows through the internal resistance.

The electromotive force (ϵ) corresponds to the OCV, and the voltage appearing across both electrodes of the battery is the same as the electromotive force (ϵ), that is, the OCV when no current (I) flows. In addition, when the current flows, the voltage appearing across both terminals (A, B) of the battery is equal to the sum of the electromotive force (ϵ) and the voltage drop in the internal resistance (r). This can be represented as the following equations.

$$OCV = \epsilon \quad (4\text{-}1)$$

$$V\_batt_{I=0} = OCV \quad (4\text{-}2)$$

$$V\_batt_{I\neq0} = \epsilon + r \cdot I \quad (4\text{-}3)$$

If so, it is possible to estimate the OCV using the above equations according to its reverse process, by measuring the voltage and current of the battery when a current flows through the load, in the state that the internal resistance value is known.

The OCV estimation is also possible by Kalman filtering as another method. The Kalman filtering is an algebraic iterative method used in many domains when one has to estimate precisely the value of a state variable but can only measure its effects or derivate signals. The method is fairly simple in concept but can be challenging to apply as an algorithm. Its concept is as follow: (i) A system for it is filled with the previous estimated state of the variables; (ii) From measurement, the previous estimated state and a custom model of the system, the next state is estimated, then from the state an estimation is made over a measurable parameter value; (iii) The parameter is then measured, and the estimation error (measure .vs. estimation) is computed; (iv) From the estimation error the estimated state is corrected and used to feed an input of the system for the next step. This method follows a step by step process. Its precision depends on the model on which it relies and on the estimation temporal step compared to the variation speed of the system under surveillance.

By running an OCV estimation module that is implemented as a program based any one out of the methods mentioned above, an OCV at the current state can be estimated. In addition to the OCV, it is also required of the battery temperature in order to calculate the battery entropy. Therefore, the battery temperature may be also measured along with the OCV estimation (Step S34). The battery temperature can be directly measured in real time by using a temperature sensor. In some cases, the temperature may be indirectly measured, or an approximated value of the temperature may be used based on the room temperature or weather information where the battery exists.

It is needed to measure the entropy over the full range of the SOC in order to determine the SOH and SOS. Therefore, this point should be considered in determining the resolution of SOC setting value in step S32 that is used as a reference point for measuring the temperature and the OCV of the battery. The battery temperature and OCV measurements may be carried out over several cycles at a specific SOC value. The number of the measurements may be determined in consideration of the precision expected and the entropy usual evolution rate of a normal system. For example, it may vary between 2 and the number as much as the user wants.

Over two consecutive charge/discharge cycle, the temperature has a very little change to stay the same. So, OCVs at same SOC but different temperatures are measured from cycle to cycle. Assuming that the entropy evolution is not significant and then relying on the relationship described by equation (1), its value may be determined over some cycles (for error correction).

The temperature value measured and the OCV value estimated in step S34 is stored in a database of the storage means within the BMS (step S36).

Then, on the basis of these measured values, operations for calculating the entropy of the battery may be conducted (step S38). The entropy calculation may be done by using the following equation.

$$k \frac{\Delta OCV_{estimated}}{\Delta T_{measured}} = \Delta S_{new}(SoC @ \text{value})_\perp \qquad (5)$$

In other words, a variation of entropy newly measured at a specific SOC value ($\Delta S_{new}$: the difference between the entropy estimated in the previous cycle and the entropy estimated at the current period) is proportion to a value obtained by dividing a variation of the estimated OCV value ($\Delta OCV^{estimated}$: a difference between the estimated OCV value of the previous cycle and the estimated OCV value of the current cycle) by a variation of the measured temperature value ($\Delta T_{measured}$: a difference between the measured temperature value of the previous cycle and the measured temperature value of the current cycle). Here, k is a constant proportional constant.

The grounds that the above entropy calculation expression is obtained are as follows. Gibb's energy represents the amount of 'useable' energy in a chemical system. In the case of a battery, this energy can be translated into electricity. Hence the Gibb's energy is the quantification in Joules of the charge present in a battery at defined instant times the voltage of the battery at that very moment. The Gibb's energy is, in the case of a battery, determined by the following equation.

$$\Delta G(x) = -nFE_0(x) \qquad (6)$$

It is defined by the state of the battery at the moment of observation. And in a battery system, because the initial energy $E_0(x)$ is the OCV, the equation (6) can be rewritten as follows.

$$\Delta G(x) = -nF \cdot OCV \qquad (7)$$

Here, x represents the percentage of the chemical reaction done, hence the amount of charge remaining, n being the amount of electron exchange in the typical elementary reaction, and F being the Faraday constant.

Further, according to the second law of thermodynamics, the Gibb's energy can be expressed as the following equation:

$$\Delta G(x) = \Delta H - T \Delta S \qquad (8)$$

Here, enthalpy H is the algebraic representation of the total amount of energy in the system, that is, sum of the useable one and the unusable one (potential energy, kinetic energy if any). In the case of a battery, as no external force is existent, the system can be reduced to a thermos-chemical analysis.

From the above equations (7) and (8), $$k \cdot OCV = -\Delta H + T \Delta S \qquad (9)$$

And, differentiating this equation with respect to temperature T gives the following equations.

$$k\Delta(OCV) = -\frac{\delta \Delta H}{\delta T} + \Delta T \cdot \Delta S + \frac{\delta \Delta S}{\delta T} \qquad (10)$$

In the general case, we can consider the battery system as a kind of quasi-static system and hence through the approximation of Ellingham we can assume that at a fixed value of x, neither entropy ($\Delta S$) nor enthalpy ($\Delta H$) is a function of the temperature. Therefore, the first and third terms of the right-hand side in the above equation (10) become zero (0), and thus the equation (10) can be simplified as follows.

$$k\Delta(OCV) = \Delta T \cdot \Delta S \qquad (11)$$

Thus it can be seen that the entropy variation $\Delta S$ can be extracted from the differential value of the OCV over the battery temperature T as shown in equation (5). Like this, if extraction of entropy variations is done at every measurement cycle, the full entropy profile until the battery is fully charged can be obtained.

Once the variation of entropy $\Delta S$ has been calculated in the step S38, it may be utilized in many ways. For example, the entropy value may be updated to estimate the SOH and SOS, and the SOH and SOS can be determined based on the variation of the entropy $\Delta S$ (step S40). Therefore, the battery's state functions SOH and SOS can be computed from the measurement around specific points through the calculus of differential entropy, with no need for any continuous monitoring.

The entropy of the battery does not evolve over battery's aging homogeneously over the entire range of the SOC. In fact, there are two values of the SOC that show a very strong variation on entropy in the aging of the battery. They are an area equal to or less than about 15% and another area equal to or larger than about 85%.

The variation on the entropy in these values is substantially proportional to the battery capacity and the self-heating rate. Thus, because SOH is an estimation of the battery capacity loss due to aging, the differential entropy would be a perfect tool to estimate the SOH through a reference equation (which can be obtained in laboratory prior to the implementation of the BMS). The self-heating rate is a chemical state function that determines the thermal runaway capability of the battery. Here it means the probability that the battery will take fire spontaneously within the safety operation limits. Hence it provides the SOS.

In order to determine accurately the point where to calculate the entropy, it is important to recognize that the SOC value must be exactly determined. To determine the entropy, there is no need for the battery to be unplugged and to have a controllable temperature. Therefore, provided is a method to extract entropy estimation from the battery that is servicing any work without preventing the battery from doing any task.

(B) Step 2: Isolation of Key Phases Based on the Entropy Profile

Through the entropy profile obtained, the key phases must be identified (Step S12). The phases can be isolated by finding out the points on the entropy profile at which phase transitions take place, in other words, the boundary points where transitions of the material state of the battery occur. Each of the phases may be associated with measurable thresholds. The thresholds may be on OCV, resistance, impedance, current behavior, etc. By determining the thresholds for the phase transitions in connection with the variation of the battery parameters and using the thresholds, the phases can be identified.

The extracted profile of the thermodynamic entropy may be a curved graph. For instance, the phase transitions may be identified from inflection points of the curved graph. In the entropy profile shown in FIG. 2(b) for example, the points A1, A2, and C1-C5 can be regarded as the inflection points and it may be assumed that the phase transitions of the internal battery occur at the inflection points. During the battery is managed, the phase transitions can be detected from the measurable battery parameters in real time.

(C) Step 3: Adaptation of Charging Algorithm to Each Phase

In this step, charging algorithms are optimized adaptively for each phase (Step S14). The present invention is based on the idea that based on the electrochemical and thermodynamic entropy profile, the optimal charging patterns or conditions may be different for each phase, and the most appropriate charging pattern for each phase may be found through repetitive experiments. Once the key phases are identified using the entropy profile, the most appropriate charging pattern for each of the isolated key phases may be defined. The most appropriate charging pattern may be, for example, a charging mode resulting in the minimum battery capacity loss within the shortest charging time. A variety of tests and analysis may be carried out to determine the most optimal charging pattern for each phase. That is, a set of comparative cycling tests with various currents and various charging patterns are performed over each phase in order to determine the fastest and safest way to charge the battery. This study over each phase may be performed in laboratory with the test devices equipped with relevant hardware and software.

In other words, the work to determine the most appropriate charging pattern for each phase is to determine the most appropriate values of charging voltage and/or charging current based on the type of charging pattern considered by the designer, while performing battery charging with varying the charging voltage and/or the charging current for each phase. That is, adapting the most appropriate charging pattern to each phase may be carried out through a voltage tuning and/or a current tuning. Here, the most appropriate charging pattern may mean the charging pattern that can charge the battery in the fastest way with causing the minimized battery damage. For instance, mobile phone companies may prefer the shorter charging time to the long battery lifetime, whereas satellite companies may prefer the latter to the former. Like this, the most appropriate charging pattern may be variable and adaptively determined relying on usage and/or applications. In consideration of this point, the criteria for adaptively determining the most appropriate charging pattern may be quantified. The adaptation of the charging algorithm to each of the phases may be, for instance, a change from the CC-CV charging mode to the pulsed charging mode. Of course, any other conventional charging patterns, for example, CC, CV pulse, burped, and trickle charging patterns may be used.

As the material properties are not changing between two phases transition, it can considered that there is no need for more than one pattern for each phase. The pattern may be chosen considering the ratio, desired to achieve by the algorithm designer, between charging speed and battery degradation. In addition, it is preferable to determine the charging pattern within a range that battery safety can be secured. As an exemplary charging pattern, determined through repetitive tests for a specific battery, to meet the requirements as above, different charging patterns may be determined as the most appropriate one for each of the key phases as follows: CC charging mode at 1 C in phase 1, CC charging mode at 2 C in phase 2, CC charging mode at 0.9 C in phase 3, and CV charging mode in phase, and so on.

Here, an example of CC charging test will be described. A set of batteries are charged and discharged at a fixed temperature over one single phase. Each battery has a different constant charging current, which leads obviously to different aging. Every battery has the same discharging current, which is small enough to have no significant impact over aging (for example, about 0.2 C).

Considering that the aging process is an exponential one, a more damaging current will create an exponentially further damaged battery. By measuring the capacity loss, for example, after 50 cycles or more, it may be possible to determine the impact of the different currents over a specific phase.

Figure 12:
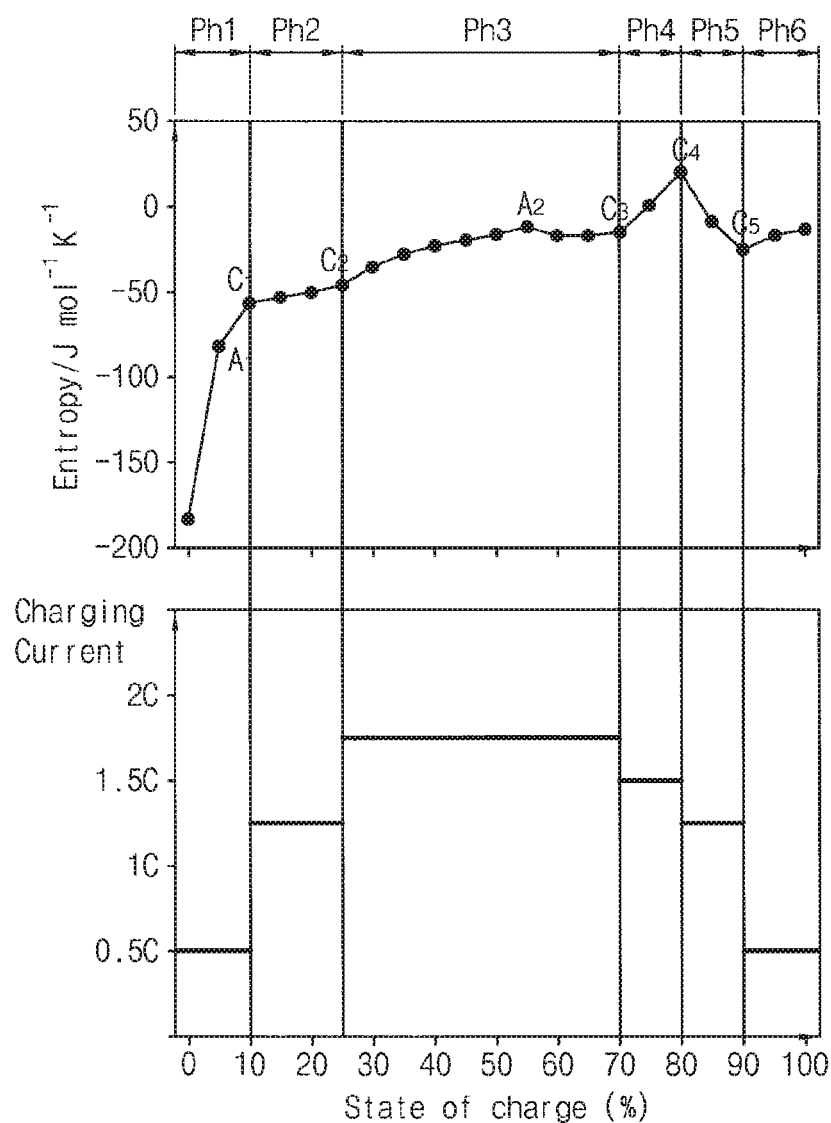
FIG. 12 illustrates graphs to describe a method of determining the phase based on the entropy profile of a particular battery and determining the optimized charging mode for each of the phases, according to an embodiment of the present invention.
Figure 13:
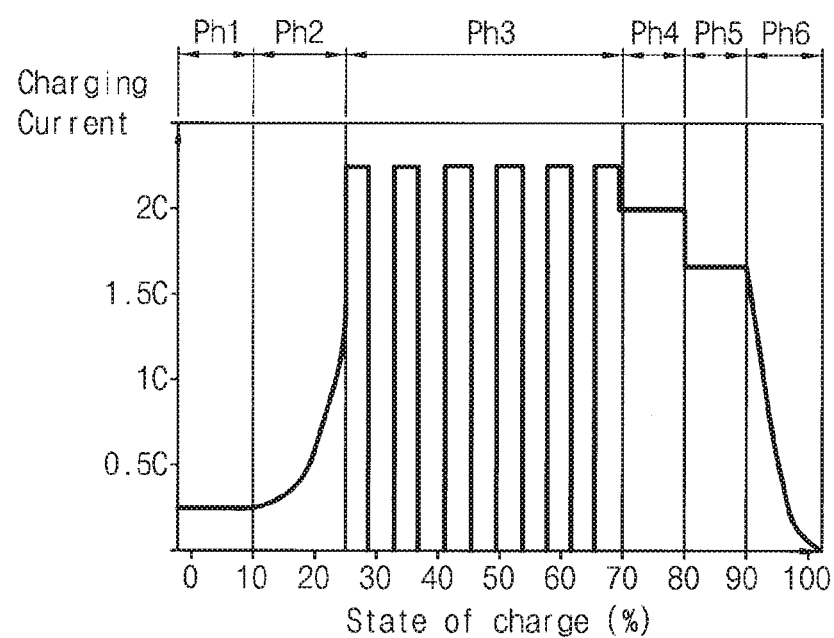
FIG. 13 illustrates a graph to describe a method of determining different charging modes adaptively optimized for respective phases with respect to the same entropy profile and phase sets as those in FIG. 12.

The goal is to extract phase by phase diagram which is the most appropriate for each phase. Optimization of the charging algorithm for each phase is to quantify the impact of charging current over capacity loss on each phase. FIG. 12 or 13 illustrates a case that the key phases are isolated into 6. That is, the 6 phases may be obtained by using 5 phase transition points of C1-C5 out of the 7 phase transition points of A1, A2, and C1-C5 as the boundary points for isolating the key phases. Of course, it is also possible to obtain 8 key phases by further using the phase transition points A1 and A2.

Figure 11:
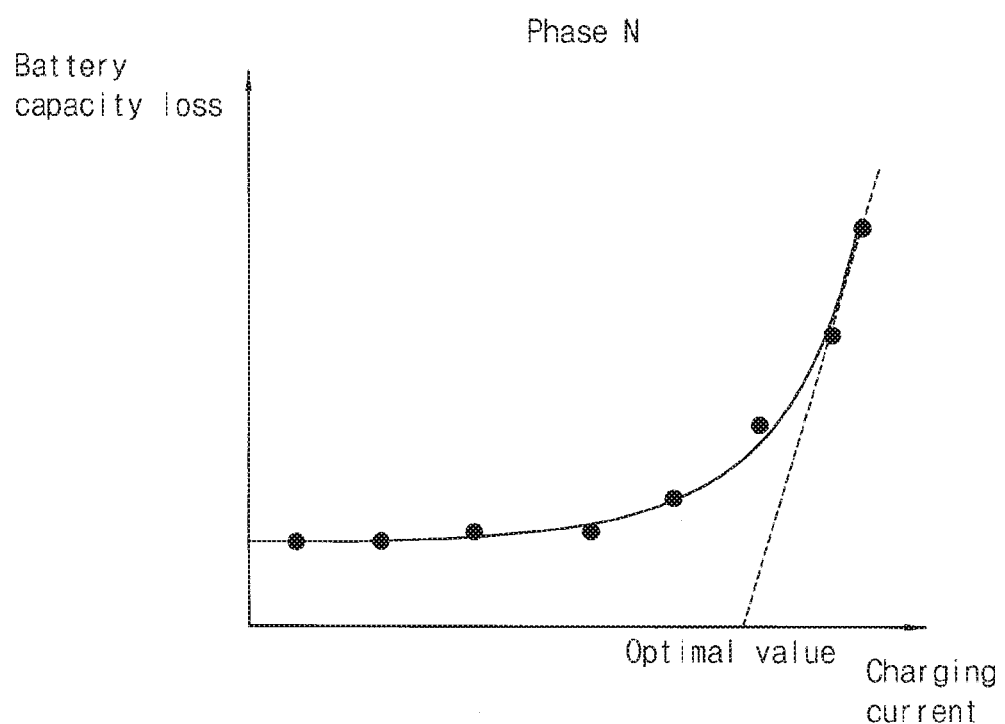
FIG. 11 illustrates a graph showing the degree of battery capacity loss according to the size of the battery charging current.

Then, by various methods, the optimal current value for the charge of this phase can be determined. Depending on the target of the algorithm and technical requirements of the applications, the optimal value will be determined differently. There may be several methods to determine the most appropriate charging current. FIG. 11 illustrates a graph to explain a case that the most appropriate charging current is determined by an asymptotic determination method considering minimization of the battery capacity loss for each phase.

According to the asymptotic determination method, a set of batteries are cycled with various charging currents over a phase ('phase N'). After a sufficient number of cycles, aging process of them may be measured. The points on the curved graph illustrated in FIG. 11 are for these measurements. Then, by plotting the relation between the charging current and the battery aging for each battery, the curve shown in FIG. 11 can be obtained. In FIG. 11, the tangential line is an example of the method to determine an optimal value of the charging current within an acceptable range of the battery capacity loss. As the ratio between the charging time and the battery degradation is fixed by a system designer, a linear function for the relation between the battery charging current and battery aging can be drawn as a tangent to the measured curve to determine the optimal value of charging current matching the system designer's needs. But it could be determined also as a horizontal line for the maximal battery's degradation authorized, or a vertical line for the maximal charging time acceptable. Any one who has an ordinary skill may use a threshold for of battery capacity loss, and/or a minimum charging time for instance. Any optimal value may be determined regarding the final application of the battery charger.

The schematic graphic shown in FIG. 11 is just an example. It should be noted that as different phases characterize different kinds of battery materials, the optimal charging value should not be the same for each phase. Moreover, from a close attention to the entropy diagram, it can be known that the entropy has growing phases and reducing phases. This means that at some point material is getting more organized (low entropy) or less organized (high entropy). Hence it means that the current cannot be simply scaled from one phase to another one, as the properties are suspected to change in a non-homogeneous way.

(D) Step 4: Design & Implementation of the Entire Charging Algorithm Being the Most Appropriate for the Battery After determining the most appropriate charging pattern for each of the key phases, a charging algorithm, dedicated to the battery itself, can be built by combining all the charging patterns phase by phase (Step S14). Here, two examples of possible resultant charging algorithms are illustrated in FIGS. 12 and 13.

The exemplary charging algorithm illustrated in FIG. 12 is a case that the obtained entropy profile of the battery is divided into 6 key phases (Ph1, Ph2, . . . , Ph6), and the CC charging mode is applied for each phase but the charging current may not be the same for each phase. That is, the charging pattern is that the charging current ascends stepwise from Ph1 to Ph3, turning to decrease in Ph4, and descending stepwise up to Ph 6.

The exemplary charging algorithm illustrated in FIG. 13 is a case that it has the same phases as FIG. 12, and any other charging mode other than the CC charging mode is determined as the most appropriate charging pattern. That is, in the case, the CC charging mode is determined as the best one in Ph1, the CV charging mode in Ph2, the pulsed charging mode in Ph3, the CC charging mode in Ph4 and Ph5, and finally the CV charging mode is determined as the best one in Ph6.

As illustrated in FIGS. 12 and 13, the most appropriate charging algorithm may be different for the same entropy profile in accordance with the goal of the charging algorithm and technical requirements of the applications.

Thus, according to the present invention, the charging algorithm for a particular battery can be constructed, on the basis of the thermodynamic measurements and analysis concerning the battery, by extracting the entropy profile of the battery and, isolating the key phases therefrom, then determining the most appropriate charging pattern adapted to each of the key phases based on a predetermined criteria for each phase, and combining all of the charging patterns determined as the optimal charging pattern for each phase.

Thus obtained optimal charging algorithm may be implemented in various forms to be used for charging of the battery. For example, it may be implemented as a program embedded in an integrated circuit system, or a program that can be run by a general-purpose CPU or MCU. The program may be taken to the charging device or BMS, being able to provide the optimum charge for its corresponding type of battery. Recently, rechargeable secondary batteries are in the spotlight, and among them the most commonly used one is the lithium-based batteries. The present invention can be applied to the BMS employed by all kinds of devices using such lithium-based batteries, as a block added to the BMS for instance. The block may be implemented in software and/or hardware. The BMS may be designed such that it is linked to the battery of a remote system via an interface so as to exert the functions of the present invention. In addition, it may be also implemented as a program running in a cloud computing system. Furthermore, it may be implemented, for example, as a logic gate on a field programmable gate array (FPGA). Regardless of the form implemented, the charging algorithm may be used for charging its corresponding battery.

Let's consider a case that a battery is charged by a charger implemented with the most appropriate charging algorithm determined by the present invention. In the charging algorithm, a threshold value for determining occurrence of the phase transition may be set for each phase. The threshold value may be a threshold value for any measurable physical quantity related to the battery. OCV, resistance, impedance, current behavior and the like may be examples of the physical quantity. In the process of charging the battery in accordance with the charging algorithm, it will be able to measure the physical quantity related to the threshold value periodically or based on predetermined criteria. By comparing the measured physical quantity with a predetermined threshold value, it is possible to know the current phase of the battery. The optimal charging algorithm may be set in advance with the most appropriate charging pattern adapted to each phase. Therefore, if it is possible to find out the current phase of the battery, the battery can be charged by the most appropriate charging algorithm.

The present invention is applicable to the BMS for charging batteries, including but not limited to the lithium-based batteries. Furthermore, it can be also applied to the charging of battery for the wearable devices, electric vehicle, portable devices, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims.

What is claimed is:

1. A method of charging a battery, the method comprising:
   extracting thermodynamic information on a material structure of a battery, the extracting including,
      measuring a temperature of the battery of which functional state is varying,
      estimating an open circuit voltage (OCV) of the battery around a time of measuring the temperature,
      estimating variation of entropy of the battery based on the measured temperature and the estimated OCV,
      estimating the SOC of the battery while continuously monitoring the SOC, and
      controlling the estimating an OCV and the estimating variation of entropy of the battery to be carried out in response to the estimated SOC being equal to a measurement reference value;
   determining a boundary point at which a state transition of a battery material occurs;
   identifying phases of the battery based on the determined boundary point; and
   determining appropriate charging patterns adapted to the identified phases, respectively.

2. The method of claim 1, further comprising:
   composing a charging algorithm for charging the battery by combining the determined appropriate charging patterns.

3. The method of claim 2, wherein the charging algorithm is implemented as at least any one of (i) a program embedded in an integrated circuit system, (ii) a program that can be run by a general-purpose CPU or MCU, (iii) a program that can be run in a cloud computing system, and (iv) a logic circuit on a field programmable gate array.

4. The method of claim 1, wherein the identifying phases identifies the phases in a manner that at least one inflection point is found from a graph of the entropy profile and the phases are isolated using at least a part of the at least one inflection point as a boundary point.

5. The method of claim 1, wherein the estimating the SOC of the battery calculates the SOC of the battery by a linear regression analysis method to estimate a remaining charge amount based on a battery temperature and the OCV of the battery.

6. The method of claim 1, wherein the estimating the SOC of the battery calculates the SOC of the battery by a Coulomb counting method that measures a current of the battery and integrates the current with time.

7. The method of claim 1, wherein the estimating the SOC of the battery calculates the SOC of the battery by Kalman filtering.

8. The method of claim 1, wherein the thermodynamic information is acquired by measuring any one of entropy, enthalpy and Gibb's energy of the battery, or any combination of these three state functions.

9. The method of claim 1, wherein the determining the appropriate charging patterns determines each of the appropriate charging patterns by a voltage tuning for each of the phases.

10. The method of claim 1, wherein the determining the appropriate charging patterns determines each of the appropriate charging patterns by a current tuning for each of the phases.

11. The method of claim 1, wherein the battery is a lithium-based battery.

12. The method of claim 1, further comprising:
to judge whether a phase transition occurs;
setting a threshold value with respect to a physical quantity for the battery for each of the phases;
measuring the physical quantity periodically or according to a basis while charging the battery;
determining a current phase of the battery by comparing the physical quantity measured with the threshold value set for each of the phases; and
charging the battery in accordance with an appropriate charging pattern adapted to the determined current phase.

13. A method of charging a lithium-based battery, the method comprising:
extracting entropy profile information on a state of charge (SOC) of the lithium-based battery;
determining a boundary point at which a state transition of a battery material occurs using the entropy profile information extracted;
identifying phases of the battery based on the boundary point determined, the identifying including identifying the phases in a manner that at least one inflection point is found from a graph of the entropy profile and the phases are isolated using at least a part of the at least one inflection point as a boundary point;
determining appropriate charging patterns adapted to the identified phases, respectively; and
composing a charging algorithm for charging the battery by combining the determined appropriate charging patterns.

14. The method of claim 13, wherein the extracting comprises:
measuring a temperature of the battery of which functional state is varying;
estimating an open circuit voltage (OCV) of the battery around a time of measuring the temperature;
estimating variation of entropy of the battery based on the measured temperature and the estimated OCV; and
estimating the SOC of the battery while continuously monitoring the SOC; and
controlling the estimating an OCV and the estimating variation of entropy of the battery to be carried out in response to the estimated SOC being equal to a measurement reference value.

15. The method of claim 13, further comprising:
setting a threshold value with respect to a physical quantity for the battery for each of the phases;
measuring the physical quantity periodically or according to a basis while charging the battery;
determining a current phase of the battery by comparing the physical quantity measured with the threshold value set for each phase; and
charging the battery in accordance with an appropriate charging pattern adapted to the determined current phase.

16. A method of charging a lithium-based battery, the method comprising:
extracting entropy profile information on a state of charge (SOC) of the lithium-based battery;
determining a boundary point at which a state transition of a battery material occurs using the entropy profile information extracted;
identifying phases of the battery based on the determined boundary point;
determining appropriate charging patterns adapted to each of the identified phases, the determining the appropriate charging patterns including determining each of the appropriate charging patterns by a voltage tuning and/or a current tuning for each of the phases; and
composing a charging algorithm for charging the battery by combining the determined appropriate charging patterns.

* * * * *